(12) United States Patent
Jeong et al.

(10) Patent No.: US 11,292,398 B2
(45) Date of Patent: Apr. 5, 2022

(54) APPARATUS FOR DISPLAYING FORWARD BLIND SPOT SITUATION

(71) Applicant: HYUNDAI MOBIS CO., LTD., Seoul (KR)

(72) Inventors: Hyeon Bin Jeong, Seongnam-si (KR); Seung Hwan Lee, Hwaseong-si (KR); Jong Joo Kang, Gunpo-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/235,318

(22) Filed: Apr. 20, 2021

(65) Prior Publication Data

US 2021/0323484 A1 Oct. 21, 2021

(30) Foreign Application Priority Data

Apr. 20, 2020 (KR) ........................ 10-2020-0047737
Apr. 20, 2020 (KR) ........................ 10-2020-0047738
Apr. 20, 2020 (KR) ........................ 10-2020-0047739

(51) Int. Cl.
*B60R 11/02* (2006.01)
*B60R 11/04* (2006.01)

(52) U.S. Cl.
CPC .......... *B60R 11/0235* (2013.01); *B60R 11/04* (2013.01); *B60R 2300/202* (2013.01);
(Continued)

(58) Field of Classification Search
CPC ...... B60K 2370/176; B60K 2370/1868; B60K 2370/21; B60K 2370/52; B60K 2370/797; B60K 35/00; B60K 2370/152; B60R 1/00; B60R 11/04; B60R 2001/1215; B60R 2025/1013; B60R 2025/1016; B60R 2300/301; B60R 2300/105; B60R 2300/8033; B60R 2300/106; B60R 2300/806; B60R 2300/8066; B60R 2300/8073; B60R 2300/8086; B60R 2300/8093; B60R 2300/70; B60R 2300/80; B60R 2300/802; H04N 7/181; G06K 9/00201; G06K 9/00778; G06K 9/00785; G06K 9/00791; G06K 9/00798; G06K 9/00805; G06K 9/00812; G06K 9/00818; G06K 9/00825; G06K 9/00845; G06K 9/325; G06K 2209/15; G06K 2209/23; G06T 2207/30236; G06T 2207/30248;
(Continued)

(56) References Cited

U.S. PATENT DOCUMENTS 8,115,811 B2 * 2/2012 Hiramaki ............... B60K 35/00
   348/148
10,116,873 B1 * 10/2018 Campbell .......... H04N 5/23293
(Continued)

*Primary Examiner* — Nathnael Aynalem
(74) *Attorney, Agent, or Firm* — NovoTechIP International PLLC

(57) ABSTRACT

Provided herein is an apparatus for displaying a forward blind spot situation. The apparatus for displaying a forward blind spot situation includes a front camera capturing a blind spot of a driver, a display device displaying image information on the blind spot of the driver captured through the front camera, and a processor controlling the image information on the blind spot of the driver captured through the front camera to be seamlessly output at a position of a driver's gaze.

8 Claims, 9 Drawing Sheets

(52) U.S. Cl.
CPC ... *B60R 2300/605* (2013.01); *B60R 2300/802* (2013.01); *B60R 2300/8093* (2013.01)

(58) Field of Classification Search
CPC . G06T 2207/30252; G06T 2207/30256; G06T 2207/30261; G06T 2207/30264; G06T 2207/30268; G08G 1/16; G08G 1/116; G08G 1/167; G08G 1/168; G08G 1/20; B60W 50/14; B60W 2050/143; B60W 2550/10; B60W 2550/14; G01S 17/93; G01S 17/931; B62D 15/029; H04W 4/40; G06V 20/64; G06V 20/53; G06V 20/56; G06V 20/588; G06V 20/58; G06V 20/586; G06V 20/582; G06V 20/584; G06V 20/597; G06V 20/62
USPC .......................................... 348/148
See application file for complete search history.

(56) References Cited

U.S. PATENT DOCUMENTS

| | | | |
|---|---|---|---|
| 2009/0303024 A1* | 12/2009 | Asari | B60Q 1/484 |
| | | | 340/425.5 |
| 2012/0154441 A1* | 6/2012 | Kim | G06F 3/147 |
| | | | 345/633 |
| 2012/0235805 A1* | 9/2012 | Nogami | G06T 7/215 |
| | | | 340/441 |
| 2016/0101734 A1* | 4/2016 | Baek | B60R 11/04 |
| | | | 348/148 |
| 2016/0311323 A1* | 10/2016 | Lee | B60K 35/00 |
| 2018/0181139 A1* | 6/2018 | Ishii | G08G 1/166 |
| 2021/0162926 A1* | 6/2021 | Lu | H04N 13/156 |

* cited by examiner (a)  (b)

APPARATUS FOR DISPLAYING FORWARD BLIND SPOT SITUATION

CROSS-REFERENCE TO RELATED APPLICATION

This application claims priority to and the benefit of Korean Patent Application No. 10-2020-0047737, filed on Apr. 20, 2020 and Korean Patent Application No. 10-2020-0047739, filed on Apr. 20, 2020, and Korean Patent Application No. 10-2020-0047738, filed on Apr. 20, 2020 the disclosure of which is incorporated herein by reference in its entirety.

BACKGROUND

1. Field of the Invention

The present invention relates to an apparatus for displaying a forward blind spot situation.

2. Discussion of Related Art

A technique for securing a field of view for a blind spot of a vehicle according to the related art has proposed a technique for securing a field of view for a blind spot generated by a pillar of the vehicle.

However, according to the related art, only an image of a portion occluded due to a specific pillar is selected among images captured using a camera and is displayed through a display installed on the pillar, and thus there is a problem in that it is not possible to display a forward front blind spot situation.

SUMMARY OF THE INVENTION

The present invention is directed to solving the above problem and providing an apparatus for displaying a forward blind spot situation which outputs, when a hazard is present while traveling in a forward blind spot, a blind spot image to allow a driver to intuitively recognize the hazard by varying a position of a display and varies a user interface (UI) according to a characteristic of a hazardous object to allow the driver to intuitively recognize the hazardous object.

According to an aspect of the present invention, there is provided an apparatus for displaying a forward blind spot situation which includes a front camera capturing a blind spot of a driver, a display device displaying image information on the blind spot of the driver captured through the front camera, and a processor controlling the image information on the blind spot of the driver captured through the front camera to be seamlessly output at a position of a driver's gaze.

The apparatus may further include a driver monitoring camera, and the processor may detect the position of the driver's gaze captured through the driver monitoring camera and control the image information on the blind spot of the driver captured through the front camera to be corrected and output according to the detected position of the driver's gaze.

The processor may determine whether a driving hazard is present in the blind spot, and when it is determined that the driving hazard is not present in the blind spot, the processor may control vehicle information required for driving to be output through the display device.

When the driving hazard is determined as being present in the blind spot, the processor may control a blind spot image including the driving hazard to be output.

When the driving hazard is determined as being present in the blind spot, the processor may detect a position of the driving hazard in the blind spot, control the image information of the blind spot to be output in a partial region based on the detected driving hazard, and control the vehicle information to be output in the remaining region.

The apparatus may further include a tilting part configured to adjust a display angle of the display device, and when the position of the driving hazard in the blind spot is detected at a position deviated from a reference position of the display device while traveling, the processor may control to adjust an angle of the display device and control the driving hazard in the blind spot to be output.

The apparatus may further include a left-right moving part configured to move a display position of the display device in a left-right direction, and when the position of the driving hazard in the blind spot is detected at a position deviated from a reference position of the display device, the processor may control the display device to be moved in the left-right direction and control the driving hazard in the blind spot to be output.

When the driving hazard in the blind spot is detected, the processor may control an output time of a blind spot image according to a type of the driving hazard.

The processor may guide a driving guide line so as to prevent a collision with the driving hazard located in the blind spot and allow the driver to drive according to the type of the detected driving hazard.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

The above-described objectives and other objectives, advantages, and features of the present invention and the manner for achieving the same will become apparent with reference to the embodiments described in detail below with the accompanying drawings.

However, the present invention is not limited to the embodiments disclosed below and may be implemented in many different forms, the following embodiments are merely provided to allow those skilled in the art to which the present invention pertains to easily understand the objectives, configurations, and effects of the present invention, and the scope of the present invention is defined by the appended claims.

Meanwhile, terms used herein are intended to describe embodiments and are not intended to limit the present invention. As used herein, the singular forms include the plural forms as well unless the context clearly indicates otherwise. It is noted that the terms "comprises" and/or "comprising" used herein do not exclude the presence or addition of one or more other components, steps, operations, and/or elements in addition to stated components, steps, operations, and/or elements.

Figure 1:
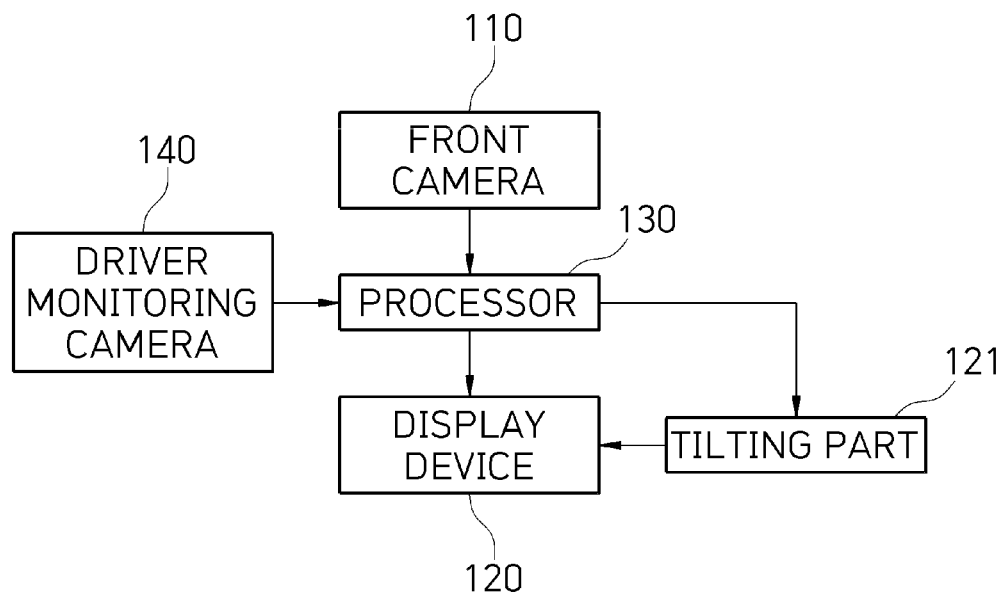
FIG. 1 illustrate an apparatus for displaying a forward blind spot situation according to one embodiment of the present invention.
Figure 2:
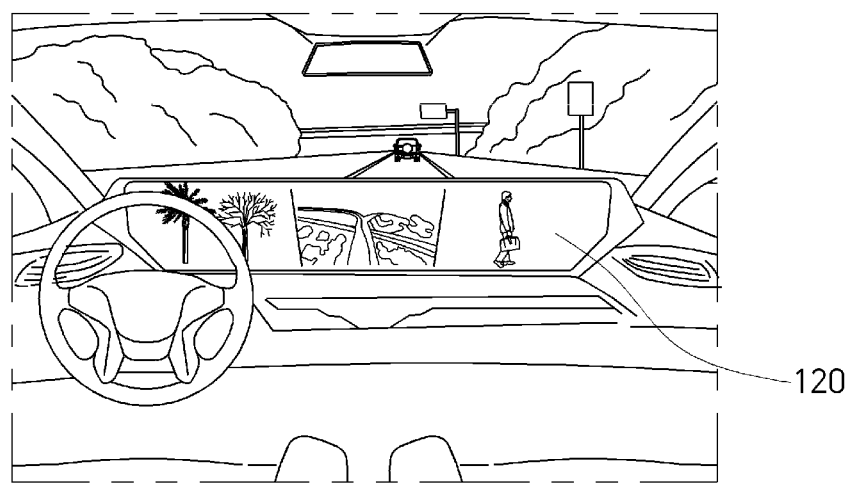
FIGS. 2 and 3 illustrates a display scene according to one embodiment of the present invention.

FIGS. 1 and 2 illustrate an apparatus for displaying a forward blind spot situation according to one embodiment of the present invention.

The apparatus for displaying a forward blind spot situation according to one embodiment of the present invention includes a front camera 110 capturing a blind spot of a driver, a display device 120 displaying image information on the blind spot of the driver captured through the front camera 110, and a processor 130 controlling the image information on the blind spot of the driver captured through the front camera 110 to be seamlessly output at a position of a driver's gaze.

The front camera 110 is installed outside the vehicle to acquire a front image including a forward blind spot of the user.

The display device 120 seamlessly displays the image information on the blind spot of the driver captured through the front camera 110.

The processor 130 controls the display device 120 to output the image information on the blind spot captured through the front camera 110 at the position of the driver's gaze.

Figure 3:
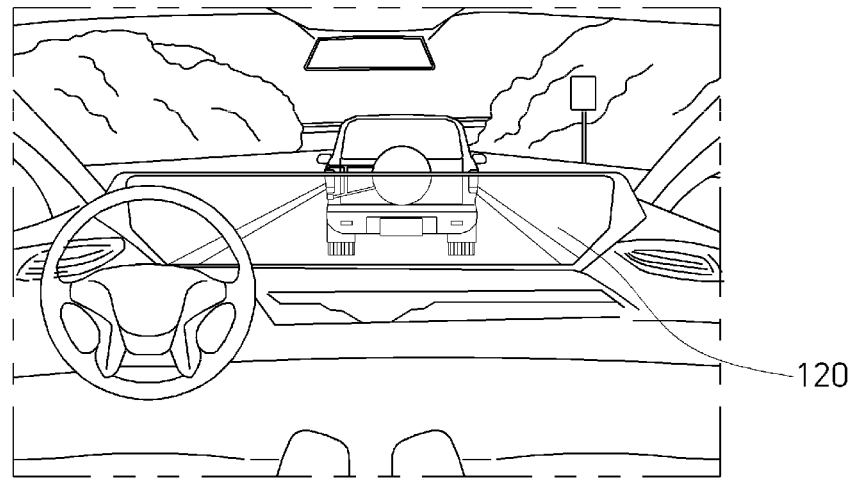

When the driving hazard is not detected in the image information on the blind spot captured through the front camera 110, the processor 130 controls to output information required for vehicle traveling as shown in FIG. 2, and when the driving hazard is detected, the processor 130 controls to output information on the blind spot as shown in FIG. 3.

As described above, according to one embodiment of the present invention, an image of a blind spot region which the driver cannot visually check while traveling is seamlessly displayed to assist the driver to be allowed to intuitively recognize a hazardous object which is present in the blind spot region.

The apparatus for displaying a forward blind spot situation according to one embodiment of the present invention includes a driver monitoring camera 140.

The driver monitoring camera 140 is provided in the vehicle and acquires an image of the driver.

The processor 130 detects the position of the driver's gaze from the image of the driver captured through the driver monitoring camera 140 and controls to correct and output the image information on the blind spot of the driver captured through the front camera 110 according to the position of the detected position of the driver's gaze.

The processor 130 determines whether a driving hazard is present in the blind spot.

When the driving hazard is determined as not being present in the blind spot according to the determination of whether the driving hazard is present or not, the processor 130 controls to display vehicle information required for traveling.

When the driving hazard is determined as being present in the blind spot according to the determination of whether the driving hazard is present or not, the processor 130 controls to output a blind spot image including the driving hazard.

Figure 4A:
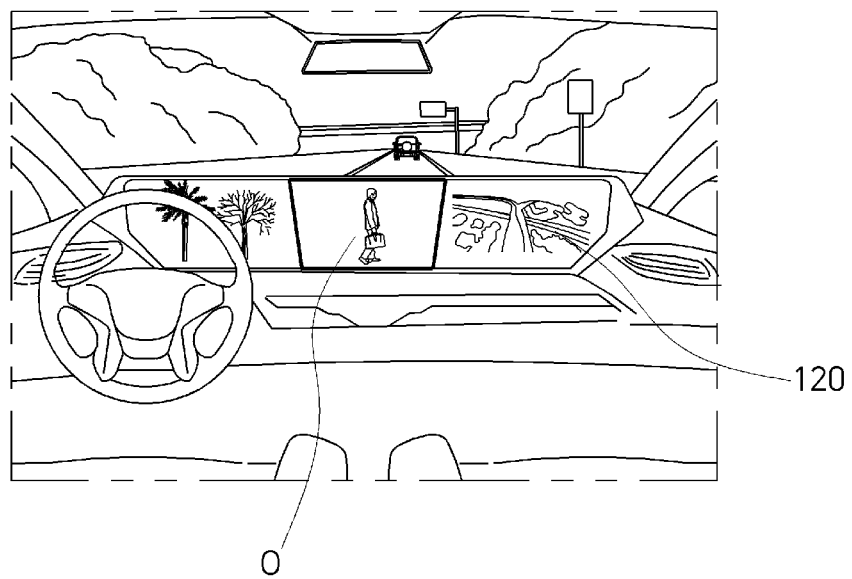
FIGS. 4A and 4B show images output through a display when a driving hazard is detected in a blind spot.
Figure 4B:
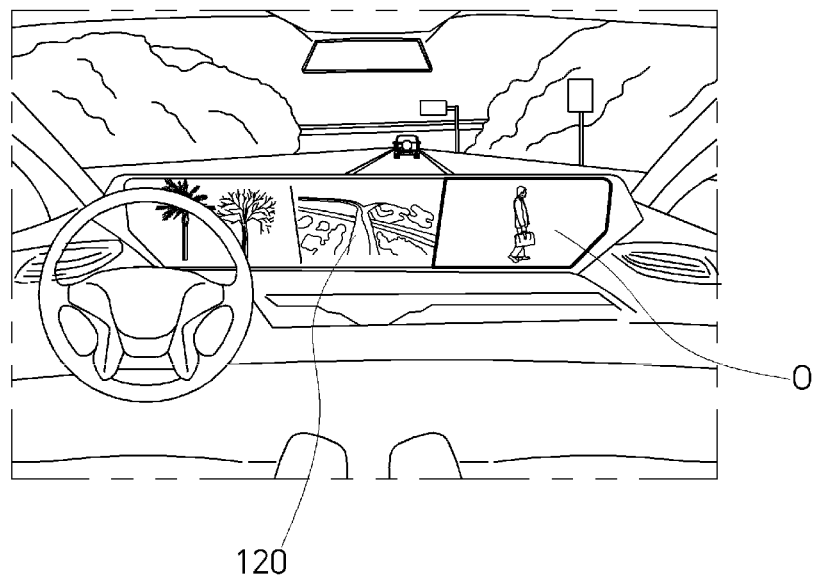

As shown in FIGS. 4A and 4B, when the driving hazard is determined as being present in the blind spot according to the determination of whether the driving hazard is present or not, the processor 130 detects a position of the driving hazard in the blind spot image, controls the image information of the blind spot to be output in a partial region based on the detected driving hazard, and controls the vehicle information to be output in the remaining region.

When the driving hazard is determined, the processor 130 may determine whether the driving hazard is a personal injury hazard, a vehicle damage hazard, or a negligibly dangerous hazard and may express the driving hazard in different colors according to classes (e.g., the life damage hazard is colored in red, the vehicle damage hazard is colored in yellow, and the neglectable danger hazard is colored in green).

According to one embodiment of the present invention, a tilting part 121 for adjusting a display angle of the display device 120 is included.

Figure 5:
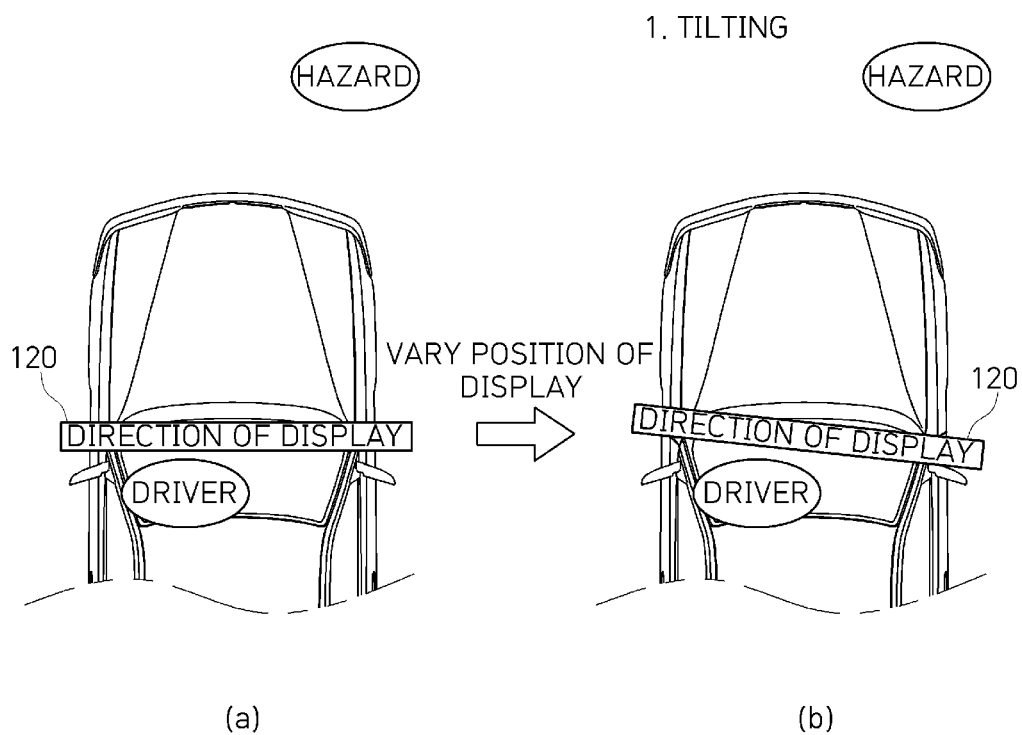
FIG. 5 illustrates tilt control for adjusting an angle of the display.

As shown in FIG. 5, when the position of the driving hazard in the blind spot is detected from a position out of a reference position of the display device 120 when traveling, the processor 130 controls to adjust an angle of the display device 120 through the tilting part 121 to output the driving hazard in the blind spot.

Figure 6:
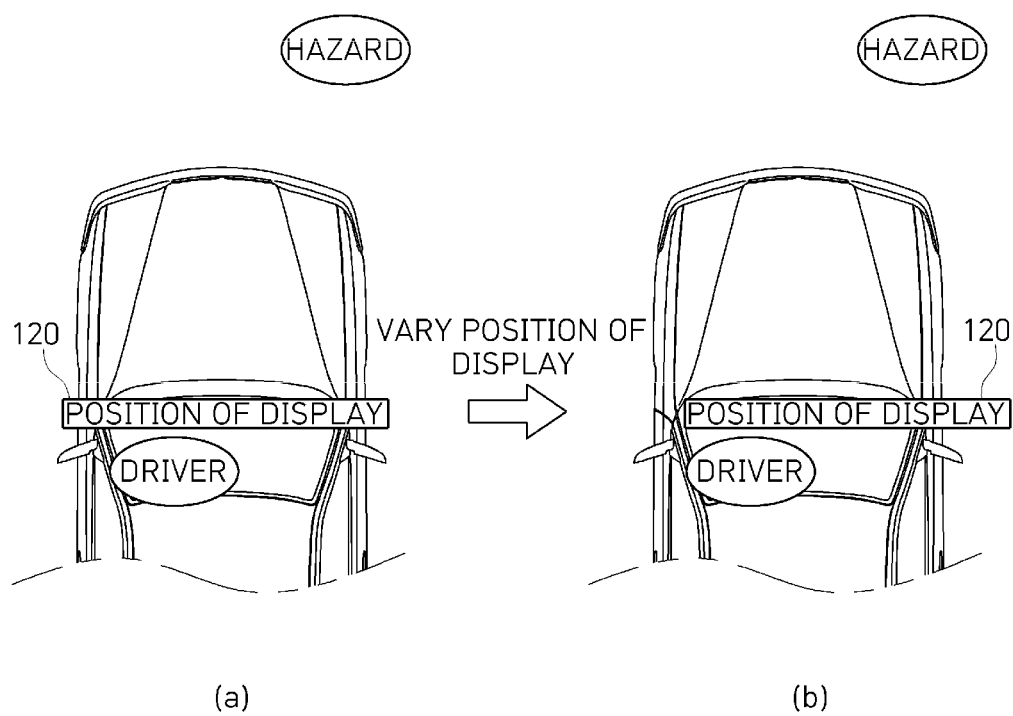
FIG. 6 illustrates a left-right movement of the display.

In addition, as shown in FIG. 6, when the position of the driving hazard in the blind spot is detected at the position out of the reference position of the display device 120 when traveling, the processor 130 controls to move the display device 120 in a left-right direction so as to output the driving hazard in the blind spot.

When the driving hazard in the blind spot image is detected, the processor 130 controls an output time of the blind spot image to be different according to a type of driving hazard.

Figure 7:
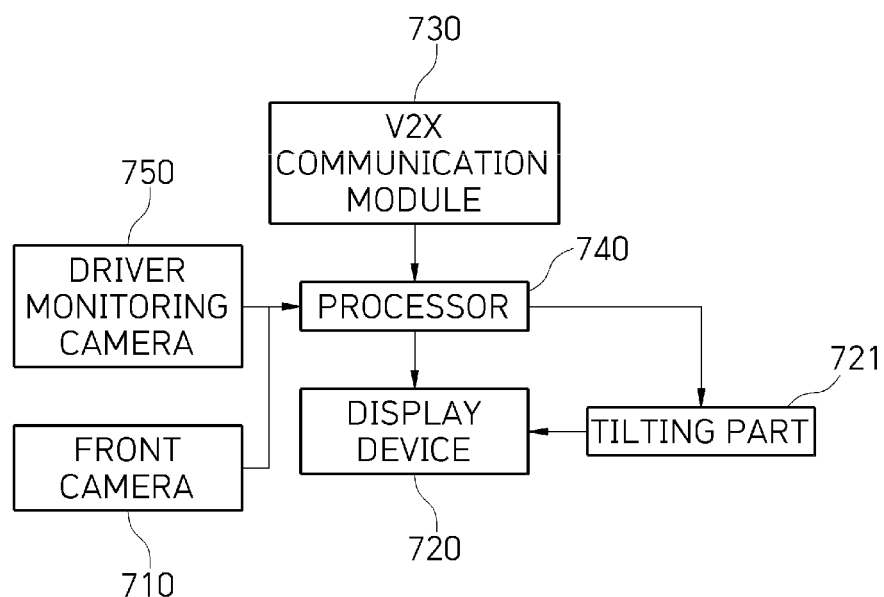
FIG. 7 illustrates an apparatus for displaying a forward blind spot situation according to another embodiment of the present invention.

FIG. 7 illustrates an apparatus for displaying a forward blind spot situation according to another embodiment of the present invention.

A front camera 710 is installed outside the vehicle to capture a front image including a forward blind spot of the user.

A display device 720 seamlessly displays image information on the blind spot of the driver captured through the front camera 710.

Figure 8:
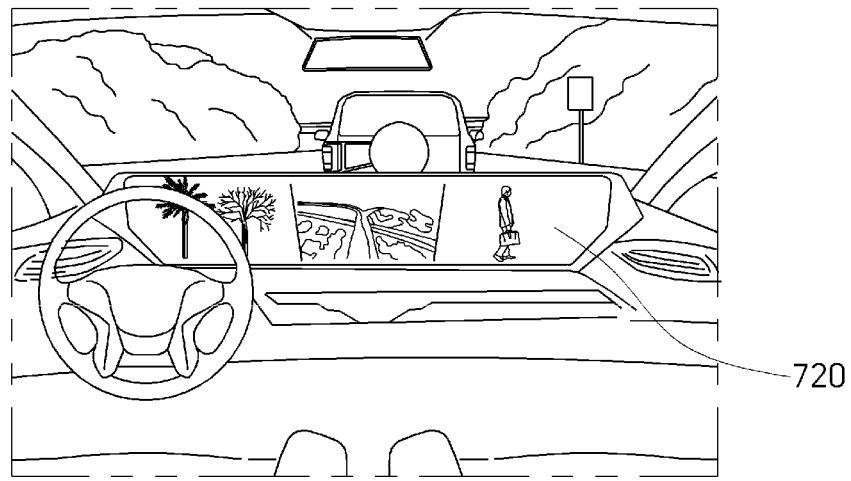
FIG. 8 illustrates an example of an image output of a blind spot in a display device.

As shown in FIG. 8, the display device 720 provides information required for driving.

A V2X communication module 730 transmits and receives the image information on the blind spot including driving hazard information to and from a front V2X vehicle or an infrastructure device.

A processor 740 controls the image information on the blind spot captured through the front camera 710 or the image information on the blind spot received through the V2X communication module 730 to be seamlessly output at a position of a driver's gaze.

According to another embodiment of the present invention, the blind spot image is seamlessly output so that, while traveling, it is possible for the driver to prevent a collision with a driving hazard through visualization of a froward blind spot.

The apparatus for displaying a forward blind spot situation according to another embodiment of the present invention includes a driver monitoring camera 750.

The driver monitoring camera 750 is provided in the vehicle and captures an image of the driver.

A low voltage differential signaling (LVDS) camera or a driver status monitoring (DSM) camera may be employed as the driver monitoring camera 750.

Figure 9:
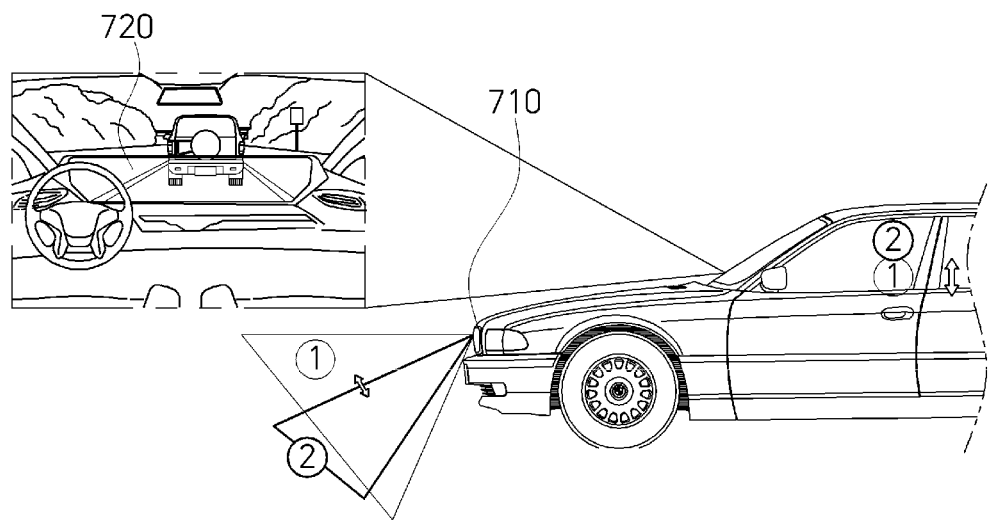
FIG. 9 illustrates tilt control of a front camera according to a driver's gaze according to another embodiment of the present invention.

As shown in FIG. 9, the processor 740 detects a position of the driver's gaze captured through the driver monitoring camera 750 and controls and outputs a capturing position of the front camera 710 to be corrected according to the detected position of the driver's gaze so that it is possible to seamlessly display the forward blind spot based on the driver's gaze regardless of a sitting height and a driving posture of the driver.

The processor 740 controls the position of the driver monitoring camera 750 to capture image information on the blind spot captured through the front camera 710 according to the position of the driver's gaze detected through the driver monitoring camera 750.

When a driving hazard is present in a blind spot region captured through the front camera 710, the processor 740 controls an output of the display device 720 so as to output a blind spot image including the driving hazard.

Figure 10:
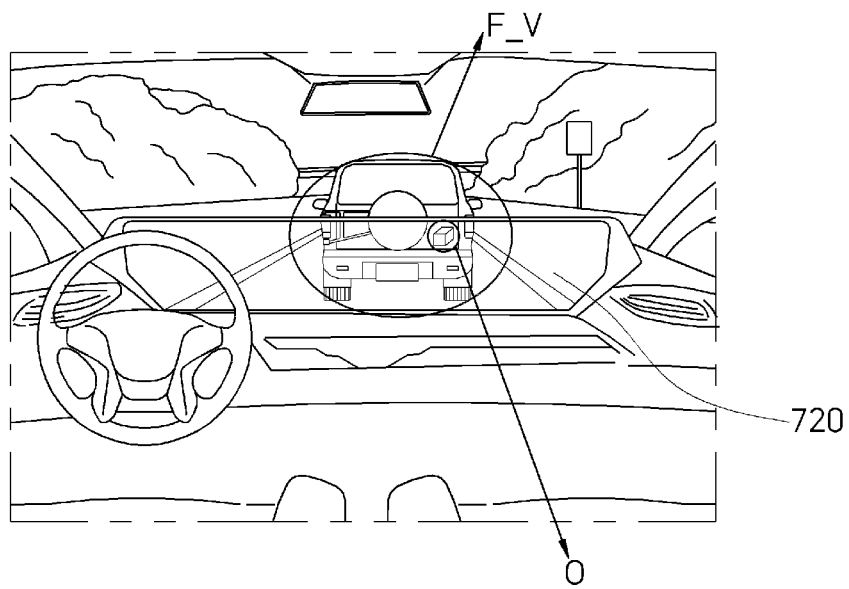
FIG. 10 illustrates an example of image processing on a front vehicle and a driving hazard in an image captured in a blind spot according to another embodiment of the present invention.

The processor 740 receives information on the driving hazard through the V2X communication module 730 on the basis of an image acquired by a front vehicle, and as shown in FIG. 10, the processor 740 transparently processes information on the front vehicle and controls to allow the driver to identify the driving hazard.

Figure 11:
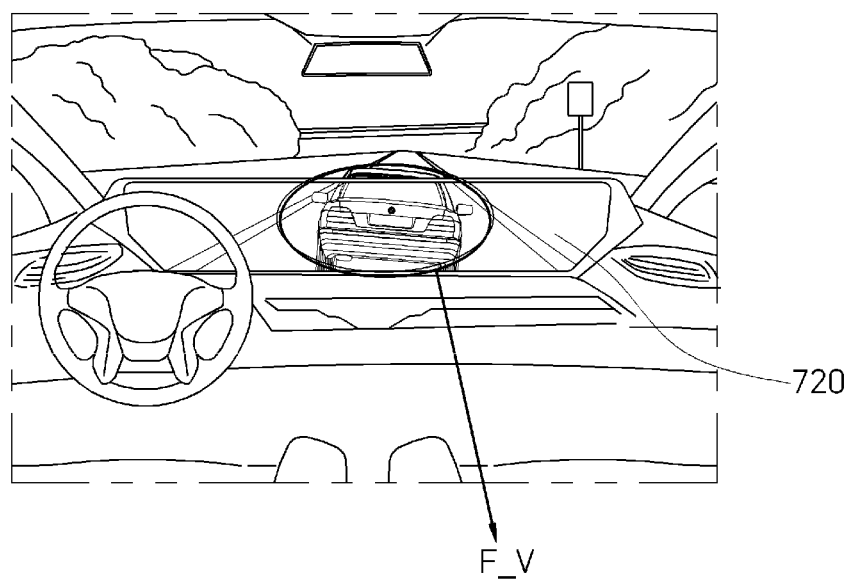
FIG. 11 illustrates an example of displaying a vehicle traveling from an opposite side on a hill according to another embodiment of the present invention.

The processor 740 determines whether the vehicle is traveling on a hill, and when the driving hazard is detected in the blind spot image received from the V2X communication module 730, as shown in FIG. 11, the processor 740 controls the display device 720 to output a vehicle traveling on an opposite side on the hill in the blind spot image.

A navigation or a G-sensor is used to detect the hill.

Figure 12:
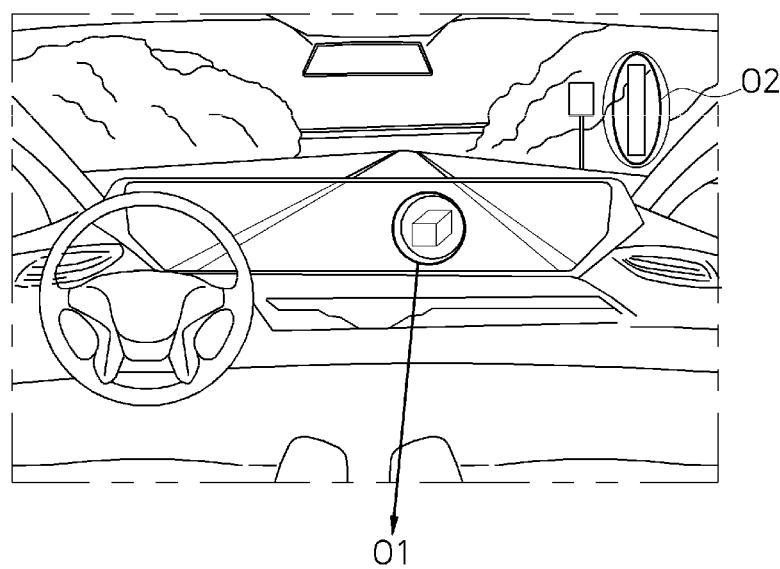
FIG. 12 illustrates an example of displaying a driving hazard received through a V2X communication module according to another embodiment of the present invention.

As shown in FIG. 12, when the processor 740 acquires driving hazard information including location information through the V2X communication module 730, the processor 740 visualizes and outputs the driving hazard information through the display device 720.

According to another embodiment of the present invention, the V2X communication module 730 is used to check a hazard in advance while traveling, thereby assisting safe driving.

The processor 740 controls the display device 120 to guide a driving guide line GL which prevents a collision with the driving hazard located in the blind spot according to a type of the detected driving hazard.

Figure 13:
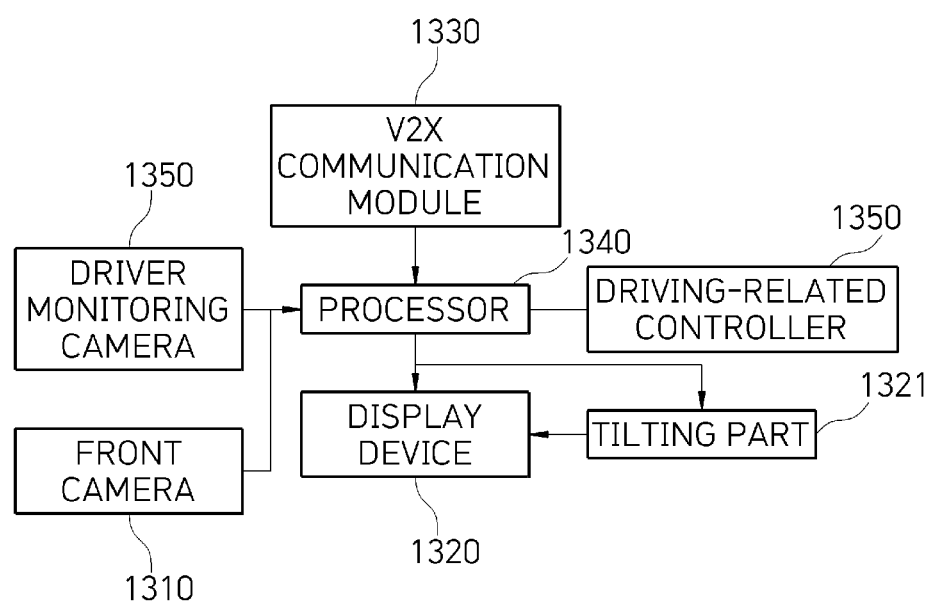
FIG. 13 illustrates an apparatus for displaying a forward blind spot situation according to still another embodiment of the present invention.

FIG. 13 illustrates an apparatus for displaying a forward blind spot situation according to still another embodiment of the present invention.

The front camera 1310 acquires a front image including a forward blind spot of the user.

A display device 1320 seamlessly displays image information on the blind spot of the driver captured through the front camera 1310.

A V2X communication module 1330 transmits and receives the image information on the blind spot including driving hazard information to and from a front V2X vehicle or an infrastructure device.

In this case, information transmitted and received through the V2X communication module 1330 preferably includes image information of the front camera 1310, and alternatively, the V2X communication module 1330 may transmit only information on a hazard among the image information of the front camera 1310.

A processor 1340 controls the display device 1320 to seamlessly output the image information on the blind spot captured through the front camera 1310 or the image information on the blind spot received through the V2X communication module 1330 at a position of a driver's gaze.

A driver monitoring camera 1311 is provided in the vehicle and captures an image of the driver.

A LVDS camera or a DSM camera may be employed as the driver monitoring camera 1311.

As shown in FIG. 9, the processor 1340 detects a position of the driver's gaze captured through the driver monitoring camera 1311 and controls and outputs a capturing position of the front camera 1310 to be corrected according to the detected position of the driver's gaze so that a visualized forward image and the forward blind spot are seamlessly displayed based on the driver's gaze regardless of a sitting height and a driving posture of the driver.

The processor 1340 controls a position of the driver monitoring camera 1311 to capture image information on the blind spot captured through the front camera 1310 according to the position of the driver's gaze detected through the driver monitoring camera 1311.

When a driving hazard is present in a blind spot region captured through the front camera 1310, the processor 1340 controls an output of the display device 1320 so as to output a blind spot image including the driving hazard.

Figure 14:
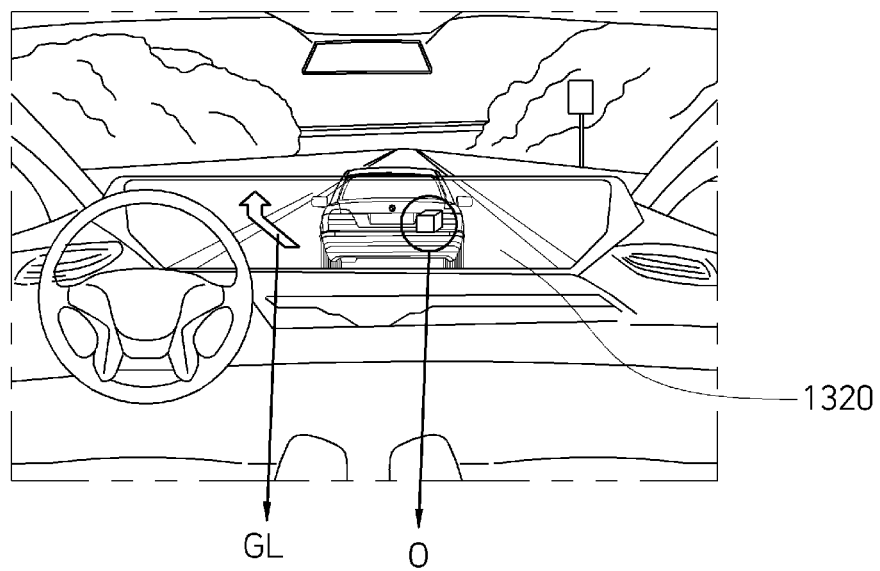
FIG. 14 illustrates a front vehicle and a hazard which are output through a display device in the apparatus for displaying a forward blind spot situation according to still another embodiment of the present invention.

As shown in FIG. 14, when a driving hazard O is detected in the blind spot image received from the V2X communication module 1330, the processor 1340 transparently processes information on a front vehicle displayed on the blind spot image and outputs and visualizes a blind spot image so as to allow the driver to identify the driving hazard O.

When the processor 1340 acquires the driving hazard information including the location information through the V2X communication module 1330, the processor 1340 may visualize and output the driving hazard information through the display device 1320.

Thus, while traveling using the V2X communication module 1330, there is an effect in that a hazard is checked in advance to assist safe driving.

As shown in FIG. 14, the processor 1340 controls the display device 120 to guide a driving guide line GL which prevents a collision with the driving hazard located in the blind spot image according to a type of the detected driving hazard.

In this case, the driving guide line GL is calculated by considering types of driving hazards (persons, bicycles, and vehicles) and an expected movement trajectory of the driving hazard.

Figure 15:
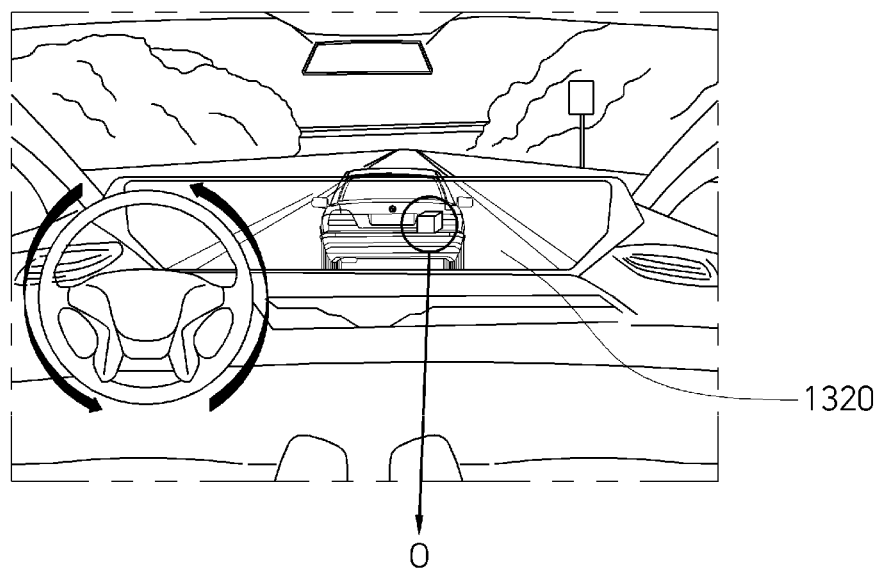
FIG. 15 illustrates an example of steering control in the apparatus for displaying a forward blind spot situation according to still another embodiment of the present invention.

While traveling at high speed, when a front obstacle is present in a blind spot received from a front vehicle, the front obstacle is displayed and, when a lane change or avoidance is advised to the driver and the driver does not respond, as shown in FIG. 15, a driving-related controller 1350, for example, a steering device, may be controlled.

When the obstacle is present in the front blind spot and it is determined that a collision will occur according to a current steering input of the driver, a steering guide is provided or the steering input is amplified and controlled.

A highway driving assist (HDA), a lane keeping assistant system (LKAS), and an adaptive cruise control (ACC) may be employed as the driving-related controller 1350.

Figure 16:
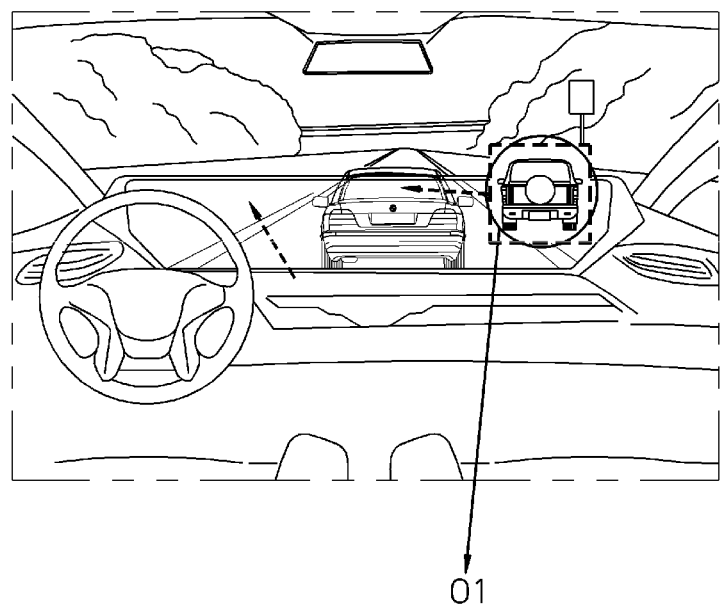
FIGS. 16 and 17 illustrate an image processing method during cooperative traveling according to still another embodiment of the present invention.
Figure 17:
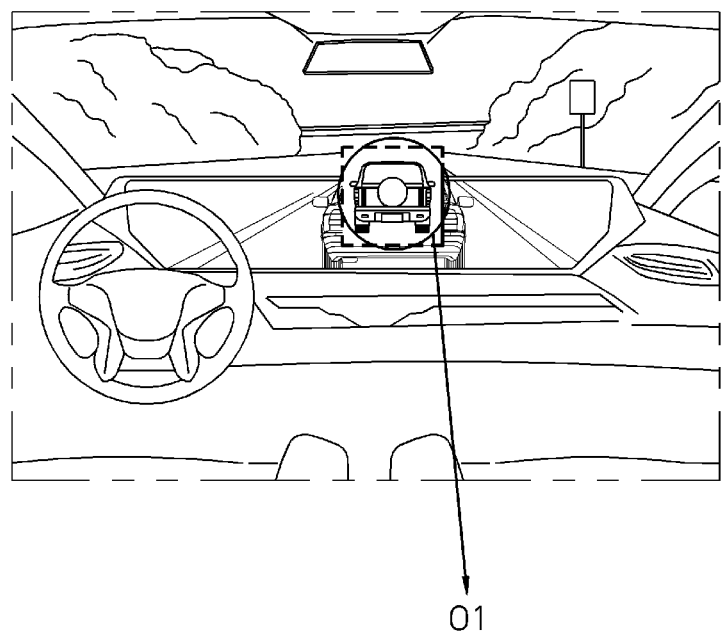

As shown in FIG. 16, when the hazard is in a moving state instead of a stopped state, the processor 1340 displays a movement path of the hazard through the display device 1320 to allow the driver to intuitively recognize whether the hazard displayed in the blind spot is a stopped hazard o or a movement hazard o1.

As described above, during cooperative traveling through vehicle-to-vehicle communication with a front vehicle, when other vehicle RV2 enters in front of a front vehicle RV1, the front vehicle RV1 transmits an image of the other vehicle RV2 to an own vehicle HV using a V2V signal, and the own vehicle HV receiving the V2V signal displays the image of the other vehicle RV2 by overlaying the image of the other vehicle RV2 with an image of the front vehicle RV1.

In addition, when a lane change of the own vehicle HV is required according to the lane change of the other vehicle RV2, a guideline for the lane change is displayed.

Meanwhile, a method of displaying a forward blind spot situation according to an embodiment of the present invention may be implemented in a computer system or may be recorded in a recording medium. The computer system may include one or more processors, a memory, a user input device, a data communication bus, a user output device, and a storage. Each of the above-described components performs data communication via the data communication bus.

The computer system may further include a network interface coupled to a network. The processor may be a central processing unit (CPU) or a semiconductor device which processes commands stored in the memory and/or the storage.

The memory and the storage may include various forms of volatile or nonvolatile storage media. For example, the memory may include a read only memory (ROM) and a random access memory (RAM).

Therefore, the method of displaying a forward blind spot situation according to the embodiment of the present invention may be implemented in a computer-executable method. When the method of displaying a forward blind spot situation according to the embodiment of the present invention is performed in a computer device, computer-readable commands may perform the method of displaying a forward blind spot situation according to the embodiment of the present invention.

Meanwhile, the above-described method of displaying a forward blind spot situation according to the present invention may be implemented as a computer-readable code in a computer-readable recording medium. The computer-readable recording medium includes all kinds of recording media storing data which are decipherable by the computer system. For example, there may be a ROM, a RAM, a magnetic tape, a magnetic disk, a flash memory, an optical data storage device, and the like. Further, the computer-readable recording medium may be distributed in a computer system connected to a computer network and may be stored and executed as a code readable in a distributed manner.

In accordance with the present invention, since a blind spot image captured through a front camera is seamlessly output at a position of a driver's gaze, there is an effect of assisting a driver to intuitively determine a hazard which is present in a forward blind spot.

When an obstacle present in a blind spot is out of a range of a display device, a position of the display device is varied so that there is an effect in which the driver can intuitively determine a position of the obstacle.

There is an effect of assisting to allow the driver to intuitively determine a location of a hazard and a degree of risk through a variation of a display user interface (UI).

There is an effect capable of inducing safe driving by outputting a hazard to the display device and, simultaneously, providing guide route information to the driver and, when driving control according to the guide route information is not performed, there is an effect capable of assisting safe driving by automatically performing driving control.

The effects of the present invention are not limited to the above-mentioned effects, and other effects not mentioned above can be clearly understood by those skilled in the art from the foregoing description.

Although the present invention has been described in detail above with reference to the exemplary embodiments, those of ordinary skill in the technical field to which the present invention pertains should be able to understand that various modifications and alterations can be made without departing from the technical spirit or essential features of the present invention. Therefore, it should be understood that the disclosed embodiments are not limiting but illustrative in all aspects. The scope of the present invention is defined not by the above description but by the following claims, and it should be understood that all changes or modifications derived from the scope and equivalents of the claims fall within the scope of the present invention.

What is claimed is:

1. A system for displaying a blind spot of a scene in front of a vehicle, comprising:
   a front camera configured to capture a scene in front of a vehicle and generate first image data containing the captured scene, the captured scene including a blind spot of the scene that is outside a viewable portion of the scene when the driver is seated in the vehicle;
   a display device having a screen positioned adjacent to the viewable portion of the scene;
   a driver monitoring camera configured to capture an image of the driver;
   a processor; and
   a computer-readable medium in communication with the processor and storing instructions that, when executed by the processor, cause the processor to control the system to perform:

detecting, based on the captured image of the driver, the driver's gaze direction;

processing, based on the detected driver's gaze direction, the first image data to generate second image data containing an image of the blind spot of the scene corresponding to the driver's gaze direction; and causing the display device to display, based on the second image data, an image of the blind spot of the scene, wherein, when viewed in the driver's gaze direction, the blind spot of the scene shown in the displayed image is seamlessly continuous from the driver's view of the viewable portion of the scene.

2. The system of claim 1, wherein the instructions, when executed by the processor, further cause the processor to control the system to perform:

determining, based on the first image data, whether a driving hazard is present in the blind spot of the scene; and in response to determining that the driving hazard is not present in the blind spot of the scene, causing the display device to display vehicle or driving information on the screen.

3. The system of claim 1, wherein the instructions, when executed by the processor, further cause the processor to control the system to perform:

determining, based on the first image data, whether a driving hazard is present in the blind spot of the scene; and in response to determining that the driving hard is present in the blind spot of the scene, causing the display device to display the image of the blind spot of the scene showing the driving hazard on the screen.

4. The system of claim 1, wherein the instructions, when executed by the processor, further cause the processor to control the system to perform:

determining, based on the first image data, whether a driving hazard is present in the blind spot of the scene; and in response to determining that the driving hazard is present in the blind spot, performing:

detecting a position of the driving hazard in the blind spot of the scene;

causing the display device to display the image of the blind spot of the scene showing the driving hazard on a first portion of the screen; and causing the display device to display vehicle or drive information on a second portion of the screen.

5. The system of claim 1, wherein:

the instructions, when executed by the processor, further cause the processor to control the system to perform:

detecting, based on the first image data, a presence of a driving hazard in the blind spot of the scene;

determining, based on the first image data, a type of the driving hazard; and determining, based on the determined type of the driving hazard, a time period for displaying the image of the blind spot of the scene on the screen, and for causing the display device to display the image of the blind spot of the scene on the screen, the instructions, when executed by the processor, further cause the processor to control the system to perform causing the display device to display the image of the blind spot of the scene on the screen for the determined time period.

6. The system of claim 5, wherein the instructions, when executed by the processor, further cause the processor to control the system to perform:

detecting, based on the first image data, a position of a driving hazard in the blind spot of the scene;

causing the display device to display a driving guideline indicating a direction to avoid the driving hazard.

7. A system for displaying a blind spot of a scene in front of a vehicle, comprising:

a front camera configured to capture a scene in front of a vehicle and generate first image data containing the captured scene, the captured scene including a blind spot of the scene that is outside a viewable portion of the scene when the driver is seated in the vehicle;

a display device having a screen positioned adjacent to the viewable portion of the scene;

a tilting part configured to adjust a display angle of the screen;

a driver monitoring camera configured to capture an image of the driver;

a processor; and a computer-readable medium in communication with the processor and storing instructions that, when executed by the processor, cause the processor to control the system to perform:

detecting, based on the captured image of the driver, the driver's gaze direction;

processing, based on the detected driver's gaze direction, the first image data to generate second image data containing an image of the blind spot of the scene corresponding to the driver's gaze direction; and causing the display device to display, based on the second image data, the image of the blind spot of the scene on the screen, wherein, when viewed in the driver's gaze direction, the blind spot of the scene shown in the displayed image is seamlessly continuous from the driver's view of the viewable portion of the scene;

detecting, based on the first image data, a presence of a driving hazard in the blind spot of the scene at a position deviated from a reference position of the display device; and causing the tilting part to adjust the display angle of the screen based on the position of the driving hazard.

8. A system for displaying a blind spot of a scene in front of a vehicle, comprising:

a front camera configured to capture a scene in front of a vehicle and generate first image data containing the captured scene, the captured scene including a blind spot of the scene that is outside a viewable portion of the scene when the driver is seated in the vehicle;

a display device having a screen positioned adjacent to the viewable portion of the scene;

a lateral moving part configured to laterally move a position of the screen in a width direction of the vehicle;

a driver monitoring camera configured to capture an image of the driver;

a processor; and a computer-readable medium in communication with the processor and storing instructions that, when executed by the processor, cause the processor to control the system to perform:

detecting, based on the captured image of the driver, the driver's gaze direction;

processing, based on the detected driver's gaze direction, the first image data to generate second image data containing an image of the blind spot of the scene corresponding to the driver's gaze direction; and causing the display device to display, based on the second image data, the image of the blind spot of the scene on the screen, wherein, when viewed in the driver's gaze direction, the blind spot of the scene shown in the displayed image is seamlessly continuous from the driver's view of the viewable portion of the scene;

detecting, based on the first image data, a presence of a driving hazard in the blind spot of the scene at a position deviated from a reference position of the display device; and causing the lateral moving part to move the screen laterally in the width direction based on the position of the driving hazard.

* * * * *